United States Patent
Schottner et al.

(10) Patent No.: US 10,560,619 B2
(45) Date of Patent: Feb. 11, 2020

(54) ADAPTER FOR PIVOTING A LENS

(71) Applicant: Jos. Schneider Optische Werke GmbH, Bad Kreuznach (DE)

(72) Inventors: Michael Schottner, Budenheim (DE); Stefan Huetsch, Fuerfeld (DE)

(73) Assignee: Jos. Schneider Optische Werke GmbH (DE)

( * ) Notice: Subject to any disclaimer, the term of this patent is extended or adjusted under 35 U.S.C. 154(b) by 0 days.

(21) Appl. No.: 16/347,857

(22) PCT Filed: Nov. 8, 2017

(86) PCT No.: PCT/EP2017/078649
§ 371 (c)(1),
(2) Date: May 7, 2019

(87) PCT Pub. No.: WO2018/087170
PCT Pub. Date: May 17, 2018

(65) Prior Publication Data
US 2019/0273849 A1    Sep. 5, 2019

(30) Foreign Application Priority Data

Nov. 11, 2016 (DE) .......................... 10 2016 121 646

(51) Int. Cl.
*H04N 5/225* (2006.01)
*G02B 7/02* (2006.01)
(Continued)

(52) U.S. Cl.
CPC ........... *H04N 5/2254* (2013.01); *G02B 7/026* (2013.01); *H04N 5/2252* (2013.01); *H04N 5/2253* (2013.01)

(58) Field of Classification Search
CPC .. H04N 5/2254; H04N 5/2253; H04N 5/2252; G03B 5/06; G03B 17/565; G03B 17/00
See application file for complete search history.

(56) References Cited

U.S. PATENT DOCUMENTS 6,318,912 B1   11/2001   Shono et al.
7,885,022 B2   2/2011    Matsumoto
(Continued)

FOREIGN PATENT DOCUMENTS

DE   33 04 115    8/1984
DE   198 04 449   8/1999
(Continued)

OTHER PUBLICATIONS

International Search Report dated Jan. 30, 2018.
International Preliminary Report on Patentability dated Oct. 30 2018.

*Primary Examiner* — Christopher K Peterson
(74) *Attorney, Agent, or Firm* — Gerald E. Hespos; Michael J. Porco; Matthew T. Hespos (57) ABSTRACT

An adapter (10) for pivoting a lens relative to an image sensor in a camera has lens-side and housing-side supporting rings (20, 30) that slide relative to one another by cylindrically curved sliding surfaces (22, 32) facing one another. A virtual cylinder axis (Z) of the sliding surfaces (22, 32) lies in a plane of the image sensor. A transmission lever (50) with first and second lever arms (51,52) is mounted on the lens-side supporting ring (20) and pivots about an axis (H) parallel to the virtual cylinder axis (Z). The first lever arm (51) extends in a circumferential direction on the lens side of the lever axis (H) and is coupled to an adjusting ring (42) mounted rotatably on the lens-side supporting ring (20). The second lever arm (52) extends axially of the housing side and is supported on an anchor (70) fixed to the housing-side supporting ring (30).

9 Claims, 7 Drawing Sheets (51) Int. Cl.
*G03B 5/06* (2006.01)
*G03B 17/56* (2006.01)
*G03B 17/00* (2006.01)
*G03B 5/08* (2006.01)

(56) References Cited

U.S. PATENT DOCUMENTS

| | | |
|---|---|---|
| 8,075,201 B2 | 12/2011 | Strong et al. |
| 2007/0071429 A1 | 3/2007 | Woehler |
| 2012/0070141 A1 | 3/2012 | Scholz et al. |
| 2013/0208368 A1 | 8/2013 | Strong et al. |
| 2015/0234198 A1 | 8/2015 | Hayakawa et al. |

FOREIGN PATENT DOCUMENTS

| | | |
|---|---|---|
| DE | 10 2005 041 431 | 3/2007 |
| WO | 2009/088951 | 7/2009 |

ADAPTER FOR PIVOTING A LENS

BACKGROUND

Field of the Invention

The invention relates to an adapter for pivoting a lens relative to an image sensor in a camera housing coupled by the adapter. The adapter has a lens-side supporting ring and a housing-side supporting ring that are mounted in sliding fashion relative to one another by correspondingly cylindrically curved sliding surfaces facing one another. The virtual cylinder axis of the cylindrical curvature of the sliding surfaces lie in a plane of the image sensor.

Related Art

DE 198 04 449 A1 discloses a tilt adapter of the type described above.

The term "adapter" is to be understood broadly here and includes not only an independent component, but also mechanical interfaces integrated into a lens or a camera housing. These mechanical interfaces enable a relative pivoting of the lens and the camera housing in the final assembled state. In this sense, the above-mentioned lens-side supporting ring is connected or connectable to the lens; and the above-mentioned housing-side supporting ring is connected or connectable to the camera housing.

With ordinary lenses, the focal plane is always parallel to the image sensor plane. In certain shooting situations, however, an oblique position of the focal plane relative to the image sensor plane is desired. As an example, two objects that are spaced apart from each other and asymmetrically positioned relative to the camera position shall be considered, both of which objects are to be sharply imaged with a low depth of field. This can be achieved by tilting the lens relative to the camera. Mathematically, the required relative alignment of object, lens and image sensor is expressed by the so-called Scheimpflug criterion. For this purpose, so-called tilt adapters for tiltable coupling of camera and lens are known to the person skilled in the art and are available both as separate components and as mechanical interfaces integrated in the lens.

The DE 198 04 449 A1 publication mentioned above discloses a so-called tilt-shift adapter as a separate component which, in addition to pivoting the lens, also permits a lateral shift perpendicular to the optical axis. However, this so-called shift function is not relevant for this invention. The pivotability of the well-known adapter is achieved by having its two supporting rings mounted opposite one another on correspondingly cylindrically curved sliding surfaces. The curvature of the sliding surfaces is selected so that the axis around which the lens pivots relative to the camera during operation lies in the plane of the image sensor. This has the advantage that no refocusing is necessary due to the pivoting and that the image section is essentially retained at the same time (as long as the relative orientation between object and lens is not changed during pivoting). To actuate the pivoting, one of the supporting rings is equipped with a rack aligned tangentially to the curvature of the sliding surface. The rack meshes with a spur gear mounted on the other supporting ring. Rotation of the spur gear, triggered by the manual actuation of an adjusting screw connected to the spur gear, causes a relative force tangential to the curvature of the sliding surface between the supporting rings which, following the curvature of the sliding surface, leads to the desired relative pivoting. However, actuation by a separate adjusting screw is cumbersome and slow, so that the use of the known adapter is problematic, especially for video recordings (for example, a fast camera movement around two people standing at a distance from each other, who should be imaged sharply and with a low depth of field at any time during the camera movement).

A similar adapter is known from US 2012/0070141 A1. US 2015/0234198 A1 also reveals a tilt adapter with the same function, but without explaining the special actuating mechanism.

WO 2009/088951 A1 discloses a lens with an integrated tilt adapter that is designed as a ball joint. This tilt adapter is pivotable in any direction and is fixed in the desired position by clamping rings. Such an apparatus is not suitable for precisely guided pivoting.

U.S. Pat. No. 8,075,201 B2 discloses a tilt adapter designed as an elastic bellows that allows an immediate, manual pivoting of the lens relative to the camera. This adapter is unsuitable, at least for professional use due to its inherent lack of stability.

DE 10 2005 041 431 A1 discloses an image sensor that can be mounted in the camera housing in pivotable fashion. Essentially the same optical function can be achieved with this, but it requires the use of special cameras that can only be used in comparatively rare shooting situations. This does not appear to make economic sense.

Conversely, U.S. Pat. No. 7,885,022 B2 discloses that the lens optics can be mounted within a lens tube in pivotable fashion. This approach requires the use of special lenses for comparatively rare shooting situations, which also makes little economic sense. The same applies to a lens pivotable within itself, as it is known from DE 33 04 115 A1.

The applicant already has a number of tilt shift lenses with integrated tilt adapter in its product range (e.g. Schneider Kreuznach Super-Angluron) in which the lens can be pivoted relative to the camera by actuating a concentric adjusting ring mounted on the lens. Similar to the known adjusting rings for manual focusing or aperture adjustment, the tilt adjusting ring mounted on the lens-side supporting ring has a helical groove on its inner surface into which a pin fixed to the housing-side supporting ring engages. The axial movement of the pin generated by the rotation of the tilt adjusting ring is translated into a pivoting movement of the two supporting rings relative to one another on the lens-side supporting ring via two opposite pivot bearing points of the housing-side supporting ring. However, the pivoting takes place about the axis lying in the area of the supporting rings, so that the pivoting is associated with defocusing on the image sensor as well as drifting of the image section. The former must be compensated by refocusing, the latter by a corresponding shifting measure. This is time-consuming, which is why these lenses can be used for video applications only to a limited extent.

It is the object of the present invention to further develop a generic tilt adapter in such a way that relative pivoting of lens and camera housing can be performed at a speed suitable for video.

SUMMARY

The invention relates to an adapter for pivoting a lens relative to an image sensor in a camera housing coupled by the adapter. The adapter comprises a lens-side supporting ring and a housing-side supporting ring that are mounted in sliding fashion relative to one another by correspondingly cylindrically curved sliding surfaces facing one another. The virtual cylinder axis of the cylindrical curvature of the sliding surfaces lies in a plane of the image sensor. The adapter is characterized in that a transmission lever pivotable about a lever axis aligned parallel to the virtual cylinder axis is mounted on the lens-side supporting ring. The first lever arm of the transmission lever extends in the lens-side supporting ring's circumferential direction on the lens side of the lever axis and, via a helical groove and a coupling body engaging into the helical groove, is coupled to a concentric adjusting ring mounted rotatably on the lens-side supporting ring. The second lever arm of the transmission lever extends in an axial direction of the lens-side supporting ring to the housing side and is supported on an anchor structure fixed to the housing-side supporting ring.

The invention provides for the use of a concentric adjusting ring rotatably mounted on the lens-side supporting ring to actuate the tilt mechanism. Such an adjusting ring can be rotated easily, quickly and precisely both manually and automatically using an appropriate adjusting adapter. However, a complicated lever mechanism with multiple force or torque deflection is required to implement this measure in such a way that the pivoting axis lies in the sensor plane to avoid defocusing and drifting of the image section. For this purpose, a corresponding transmission lever is mounted on the lens-side supporting ring. The bearing arrangement is such that the transmission lever is pivotable about a lever axis parallel to the virtual cylinder axis, which represents the curvature of the two sliding surfaces of the supporting rings. The lever axis also preferably intersects the optical axis of the lens, i.e. the central axis of the opening of the lens-side supporting ring. In other words, the lever axis of the transmission lever is parallel to the axis of relative pivoting of lens and housing. The two lever arms of the transmission lever are shaped very differently. The first lever arm, also referred to herein as the lens-side lever arm, extends from the lever axis essentially in the circumferential direction of the lens-side supporting ring. The first lever arm is coupled to the adjusting ring via a groove/coupling body mechanism. The adjusting ring may bear a helical groove (directly or indirectly, e.g. via a groove ring connected to it in a rotationally fixed manner) into which a coupling body arranged on the first lever arm engages. The coupling body of one embodiment is arranged on the lever axle with a 90° offset to the linkage point of the lever arm. This creates a particularly favorable lever transmission ratio. Conversely, it is also possible that the adjusting ring (directly or indirectly) bears the coupling body and the first lever arm bears the helical groove. However, the terms "groove" and "coupling body" or "groove/coupling body mechanism" are to be interpreted broadly in the context of this invention. It is intended that even variants in which the "groove" is only a half-groove, i.e. essentially an edge, are covered by this term. In this case, the edge and the coupling body, which can also be designed as a (corresponding) edge, are preferably spring-loaded against each other. In any case, rotation of the adjusting ring leads to an axial deflection of the coupling point between the transmission lever and the adjusting ring and thus to a pivoting of the transmission lever about its lever axis.

The second lever arm of the transmission lever, also called the housing-side lever arm here, extends from the lever axis in the direction of the housing-side supporting ring and is supported there against an anchor structure fixed to the housing-side supporting ring. The rotation of the adjusting ring described above thus leads to a tangential movement of the free end of the housing-side lever arm, whereby a corresponding force is exerted on the anchor structure. The housing-side supporting ring is thus subjected to a lateral force perpendicular to the lever axis or virtual cylinder axis and parallel to the sliding surface tangent, resulting in a relative displacement of the supporting rings along their sliding surfaces. This corresponds to a relative pivoting of a lens coupled to the lens-side supporting ring relative to a camera housing coupled to the housing-side supporting ring, the axis of this pivoting lying within the camera housing, in particular in the plane of the image sensor arranged in the camera.

The result is a pivotability that is comfortably, fast and precisely controllable, so that it is especially compatible with the requirements of video recordings.

Various options are available to the person skilled in the art with regard to the supporting of the free lever end of the housing-side lever arm on the anchor structure of the housing-side supporting ring. For example, a first embodiment of the invention provides that the free end of the housing-side lever arm and the anchor structure have corresponding, intermeshing, curved toothing sections. Although such supporting is complex in design, it has the advantage of a linear, play-free transmission of the adjusting ring rotation into the pivoting, at least on the short lever side.

In an alternative embodiment of the invention, however, it is intended that the anchor structure forms a tangential force-supporting bearing with axial play for the free end of the housing-side lever arm. This can be achieved in particular in that the free end of the housing-side lever arm has an axial slot which embraces a pin aligned parallel to the lever axis and fixed to the housing-side supporting ring. A kinematic reversal of such supporting, i.e. a free end of the second lever arm engaging into a slot of the anchor structure, is also conceivable. The tangential force support is essential for the pivoting. However, when pivoting, there are necessarily changes in the distance between the anchor point fixed to the housing-side supporting ring and the lever axis of the transmission lever, which lever axis is positioned on the lens-side supporting ring. Consequently, an axial relative movability (with respect to the second lever arm) must be maintained between the free end of the housing-side lever arm and the anchor structure. These two requirements, i.e. tangential force transmission and axial freedom of movement, can be achieved particularly well together with the slot/pin mechanism mentioned. Any resulting non-linearity between the rotation of the adjusting ring and the pivoting can be taken into account by scaling the adjusting ring. As a rule, however, the non-linearity will be so low that no adverse effects on the quality of the recorded images are to be expected.

It is advantageous that the adjusting ring is fixable to the lens-side supporting ring in a rotationally fixed manner by means of a locking device. This facilitates handling and can serve to prevent unintentional pivoting, so that the adapter according to the invention does not have to be removed even with "normal" shots. It is also conceivable to provide adjustable stops for the adjusting ring by means of which pivoting limits can be set.

It is advantageous that the adjusting ring bears an external toothing. This allows a secure grip for manual adjustment. However, a suitably designed external toothing can serve as a mechanical interface to an external adjusting device equipped with a corresponding motor-driven adjusting wheel, as provided for in a further embodiment of the invention. Such external adjustment modules are known for focusing and aperture rings. Their application can easily be adapted to the tilt adjusting ring according to the invention, so that the applicability of generally known remote control modules (wired or wireless) for lens rotation can be regarded as a further advantage of the present invention.

Further features and advantages of the invention result from the following specific description and the drawings.

DETAILED DESCRIPTION

Identical reference numbers in the figures indicate identical or analogous elements.

Figure 1:
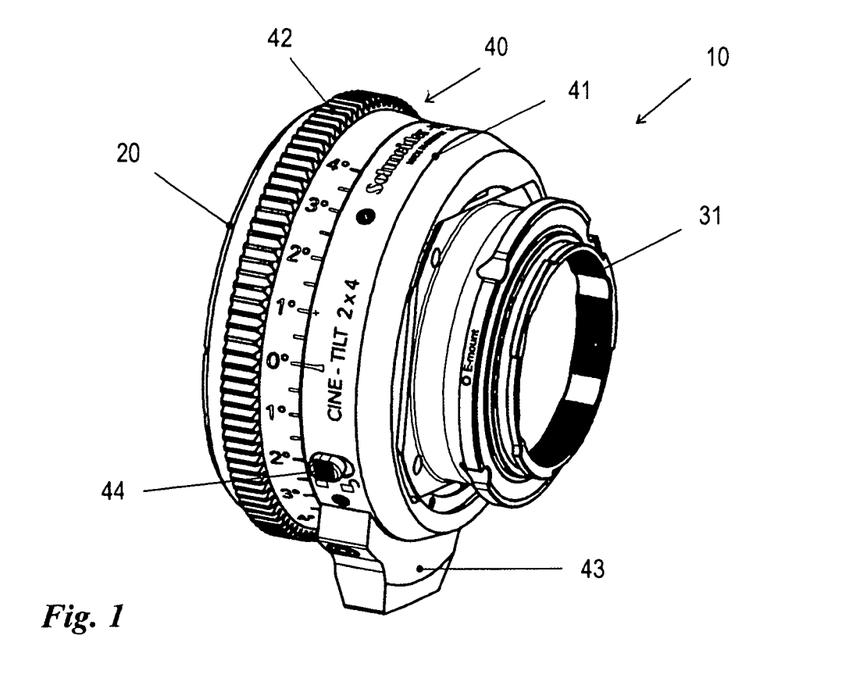
FIG. 1 shows a perspective representation of an adapter according to the invention.

FIG. 1 shows a perspective view of an adapter 10 in accordance with the invention, which, in the embodiment shown, is designed as an isolated component which is couplable to a camera housing on the one side and to a lens on the other side. The adapter 10 essentially comprises a lens-side supporting ring 20 and a housing-side supporting ring 30. In FIG. 1, the lens-side supporting ring 20 is largely covered by a casing 40 consisting of a fixed part 41 fixed to the lens-side supporting ring 20 and a coaxial adjusting ring 42 mounted rotatably in relation to said fixed part. The fixed part 41 of the casing 40 partly also projects beyond the housing-side adjusting ring 30, of which essentially the bayonet connection 31 is visible in FIG. 1, with which bayonet connection the adjusting ring can be fixed to a camera housing. The person skilled in the art will understand that the type of bayonet connection 31 can be designed differently to adapt to different bayonet standards. Of course, another coupling device compatible with the housing can also be provided instead of a bayonet connection.

A tripod connector 43 for fixing the adapter and a housing and a lens connected with said adapter can be seen on the casing 41. In addition, the casing 40 has a locking knob 44 with which the adjusting ring 42 is fixable relative to the fixed part 41 of the casing 40, in particular clampable by means of a ramp mechanism.

Figure 2:
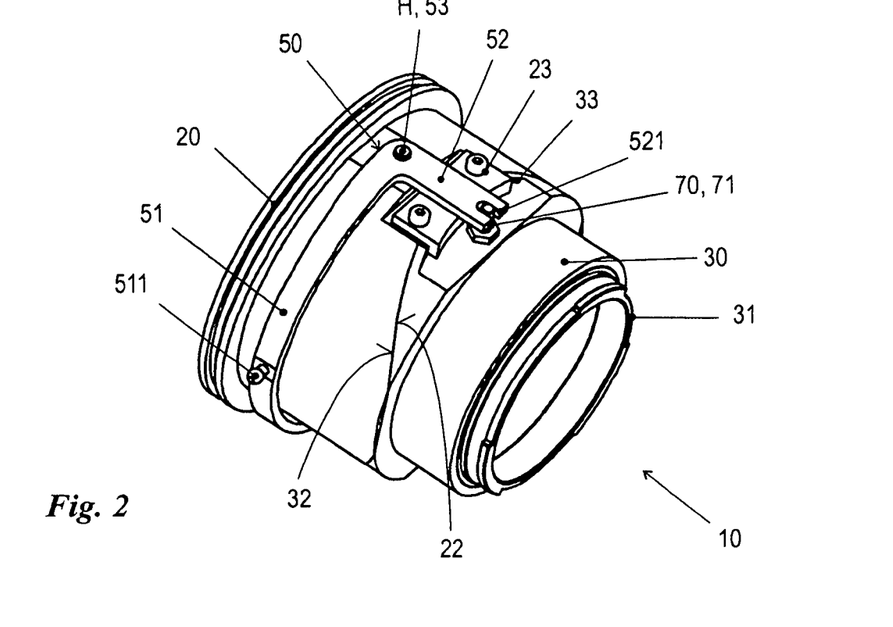
FIG. 2 shows the adapter of FIG. 1 without casing and adjusting ring.
Figure 3:
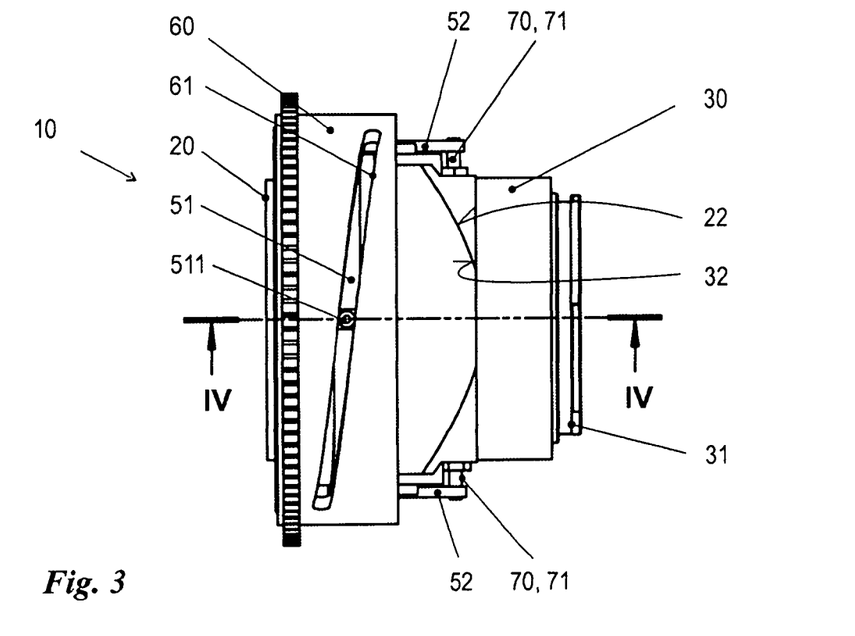
FIG. 3 shows the adapter of FIG. 1 without casing in side view.

FIG. 2 shows the adapter 10 of FIG. 1 without the casing 40 and without a groove ring 60 to be explained later, which groove ring in FIG. 1 is covered by the casing 40 but is well recognizable in FIGS. 3-17.

If no explicit reference is made below to a specific figure, FIGS. 2-6 will be explained together. The lens-side supporting ring 20 and the housing-side supporting ring 30 are in contact with each other at the corresponding sliding surfaces 22, 32. They are held together by means of a guide plate 23 screwed to the lens-side supporting ring 20. The guide plate 23 projects axially beyond the contact surface of the supporting rings 20, 30 and engages behind a guide edge 33 parallel to the sliding surfaces 22, 32 on the housing-side supporting ring 30. The sliding surfaces 22, 32 thus form a sliding bearing which can be precisely adjusted relative to the guide edge 33 by means of the guide plate 23.

Figure 4:
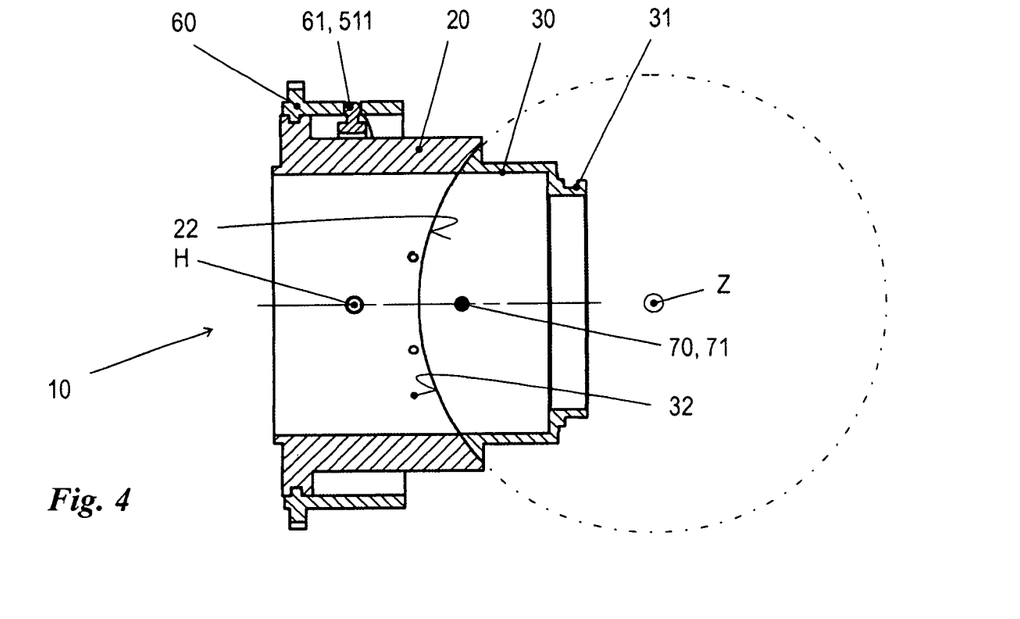
FIG. 4 shows a sectional view along section line IV-IV in FIG. 3.
Figure 5:
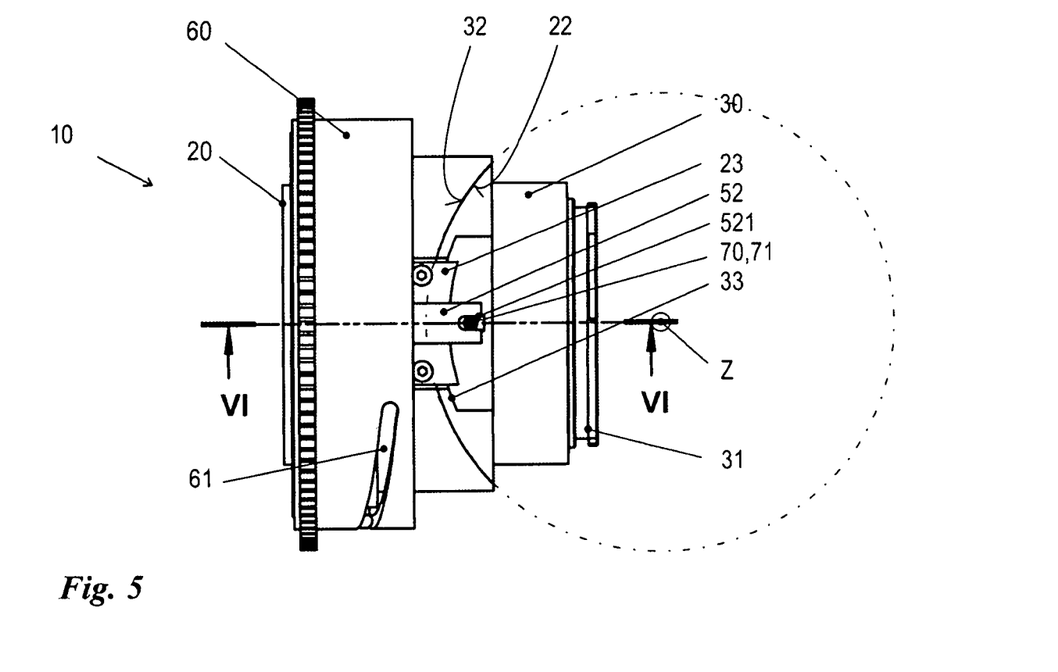
FIG. 5 shows a top view of the adapter of FIG. 1 without casing.

As can be seen especially in FIGS. 4 and 5, the sliding surfaces 22, 32 are cylindrically curved. In other words, each point of the sliding surfaces is equidistant from a common, virtual cylinder axis Z. If the lens-side supporting ring 20 slides on the common sliding surfaces 22, 32 while the housing-side supporting ring 30 is held in place, it describes a partial circular path around the cylinder axis Z. In the final assembly state, i.e. with the lens coupled to the lens-side supporting ring and the housing coupled to the housing-side supporting ring, the lens pivots relative to the image sensor fixed in the housing with the virtual cylinder axis Z lying in the sensor plane. In practical operation, however, the lens-side supporting ring 20 and the lens would be fixed in the position aligned with the object to be captured while the camera body is pivoted. Such a pivoting leads to a tilting of the focal plane without, however, being connected with defocusing in the center of the image or drifting of the image section. This functionality is generally known to the person skilled in the art from other tilt adapters. The present invention essentially refers to the special mechanics for the execution of the described pivoting, of which mechanics the following preferred embodiments are to be described in detail.

As can be seen particularly in FIG. 2, a transmission lever 50 is hinged on the lens-side supporting ring 20. The transmission lever 50 can be pivoted around a lever axis H, which is aligned parallel to the virtual cylinder axis Z. In the embodiment shown, as is particularly evident in FIG. 6, the lever axis H is realized by two bolts 53, which are fixed opposite each other on the lens-side supporting ring 20, said bolts reaching through corresponding recesses on the transmission lever 50. A first lever arm 51 extends between the two bolts 53 on one side in the circumferential direction of the lens-side support arm 20. The first lever arm 51 thus forms a semi-circular arc between the two bolts 53.

At its apex, the arched first lever arm 51 bears a pin 511 equipped with a spherical head. As can be seen particularly in FIGS. 3 and 4, the pin 511 engages in a groove 61 of a groove ring 60, which is coaxially rotatably mounted on the lens-side supporting ring 20. The groove ring 60 is connected to the adjusting ring 42 of the casing 40 in a rotationally fixed manner, so that a rotary actuation of the adjusting ring 42 leads to a rotation of the groove ring 60. In this respect, the adjusting ring 42 indirectly bears the groove 61 in this embodiment. It is of course also conceivable to use embodiments in which the adjusting ring 42 and the groove ring 60 are designed together as an integrated component so that the adjusting ring 42 would directly bear the groove 61 in these cases. The groove 61 helically wraps around part of the circumference of the groove ring. When the groove ring 60 rotates, the side walls of the helical groove 61 exert an axially directed force on the pin 54 engaging into the groove 61 and thus on the apex of the first lever arm 51. This results in a pivoting of the first lever arm 51 around the lever axis H.

Figure 6:
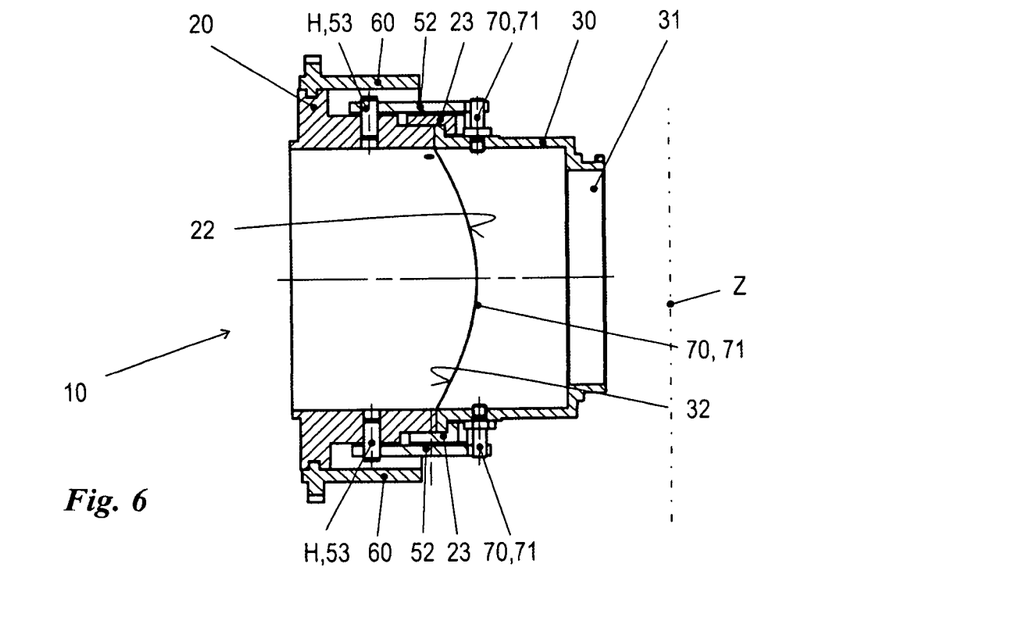
FIG. 6 shows a sectional view along section line VI-VI in FIG. 5.

As can be seen particularly in FIGS. 2 and 6, a second lever arm 52 of the transmission lever 50 extends on the housing side essentially in the axial direction from the lever axis H. The pivoting of the first lever arm 51 caused by the rotation of the groove ring 60 therefore leads to an essentially tangentially directed movement of the free end of the second lever arm 50 due to deflection at the lever axis H. The free end of the second lever arm 52 is supported by an anchor structure 70 fixed to the housing-side supporting ring 30. In the embodiment of FIGS. 2-15, this anchor structure 70 is designed as a pin 71 aligned parallel to the lever axis H and the virtual cylinder axis Z. This pin protrudes into a slot 521 of the free end of the second lever arm 52. The tangential movement of the free end of the second lever arm 52 described above thus leads to a tangential force acting on the pin 71.

The resulting lateral force, which acts on the housing-side supporting ring 30, leads to its displacement relative to the lens-side supporting ring 20, whereby the coupling of the two supporting rings 20, 30 via the sliding surfaces 22, 32 and the guide 23, 33 leads to a deflection into the relative pivoting described above.

As a result, a quick and precise relative pivoting of the lens and camera body can be achieved by simply rotating the adjusting ring 42, without this leading to defocusing or to drifting of the image section.

Figures 7, 8, 9:
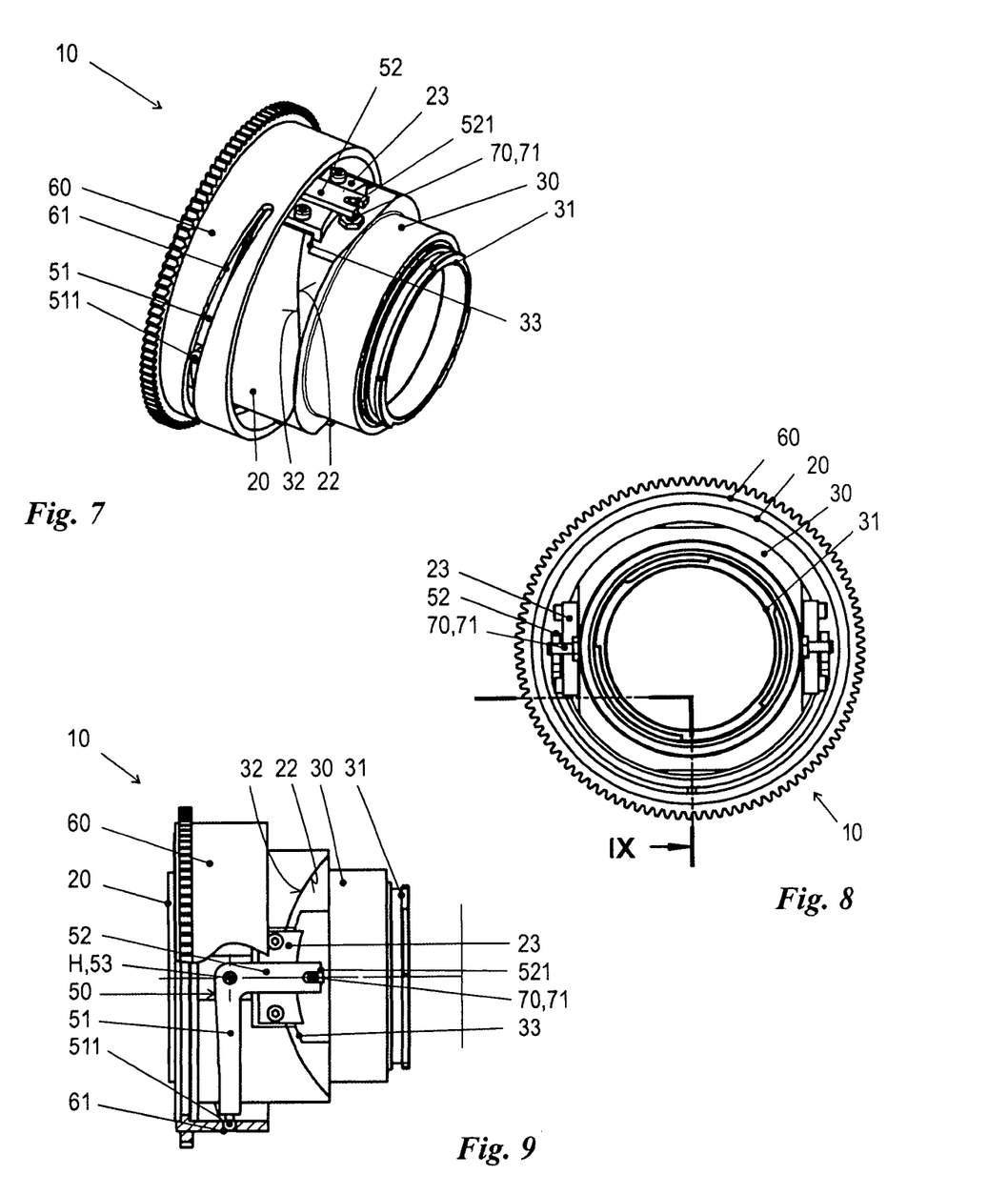
FIG. 7 shows a perspective view of the adapter of FIG. 1 without casing in neutral position.
FIG. 8 shows a housing-side axial view of the adapter of FIG. 7.
FIG. 9 shows a partial cut view along section line IX in FIG. 8.

FIGS. 7-15 show individual phases of the pivoting described above. FIGS. 7-9 show the adapter 10 in a neutral position where the pin 511 on the first lever arm 51 is located approximately in the middle between the two ends of the helical groove 61. In this position, the first lever arm 51 circles the lens-side supporting ring 20 exactly in the circumferential direction. The second lever arm 52 extends from the lever axis H exactly axially towards the housing-side supporting ring 30. The lens-side and housing-side supporting rings 20, 30 are positioned coaxially relative to one another in this position.

Figures 10, 11, 12:
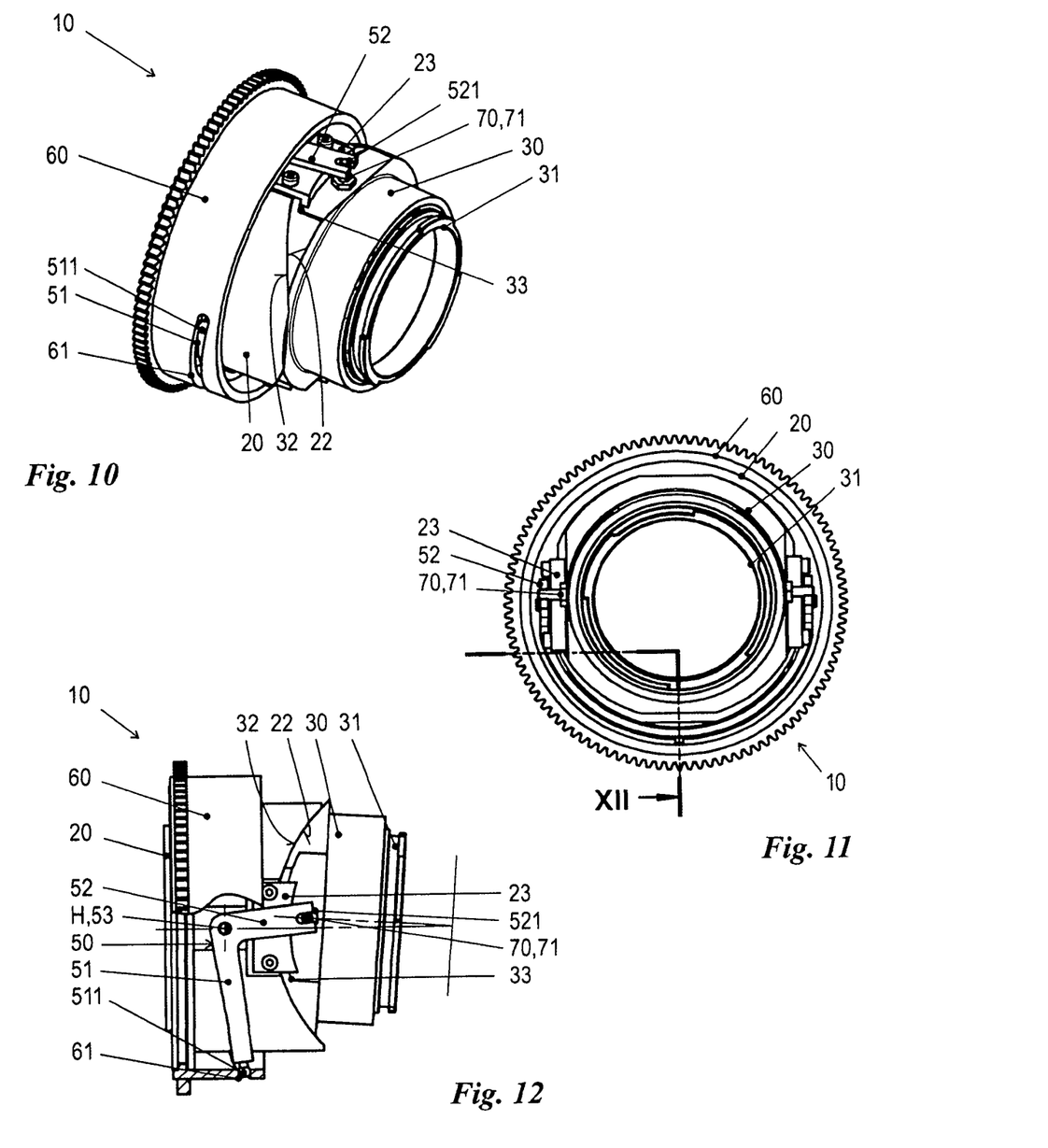
FIG. 10 shows a perspective view of the adapter of FIG. 1 without casing in a first pivoting position.
FIG. 11 shows a housing-side axial view of the adapter of FIG. 10.
FIG. 12 shows a partial cut view along section line XII in FIG. 11.

In FIGS. 10-12, the groove ring 60 (viewed from the housing side) is rotated counterclockwise. The pin 511 of the first lever arm 51 is located in the area of the end of the helical groove 61 nearer to the housing. The first lever arm 51 is therefore pivoted to the housing side. Accordingly, the second lever arm 52 is pivoted to the right, so that the housing-side supporting ring 30 pivots to the left relative to the lens-side supporting ring 20.

Figures 13, 14, 15:
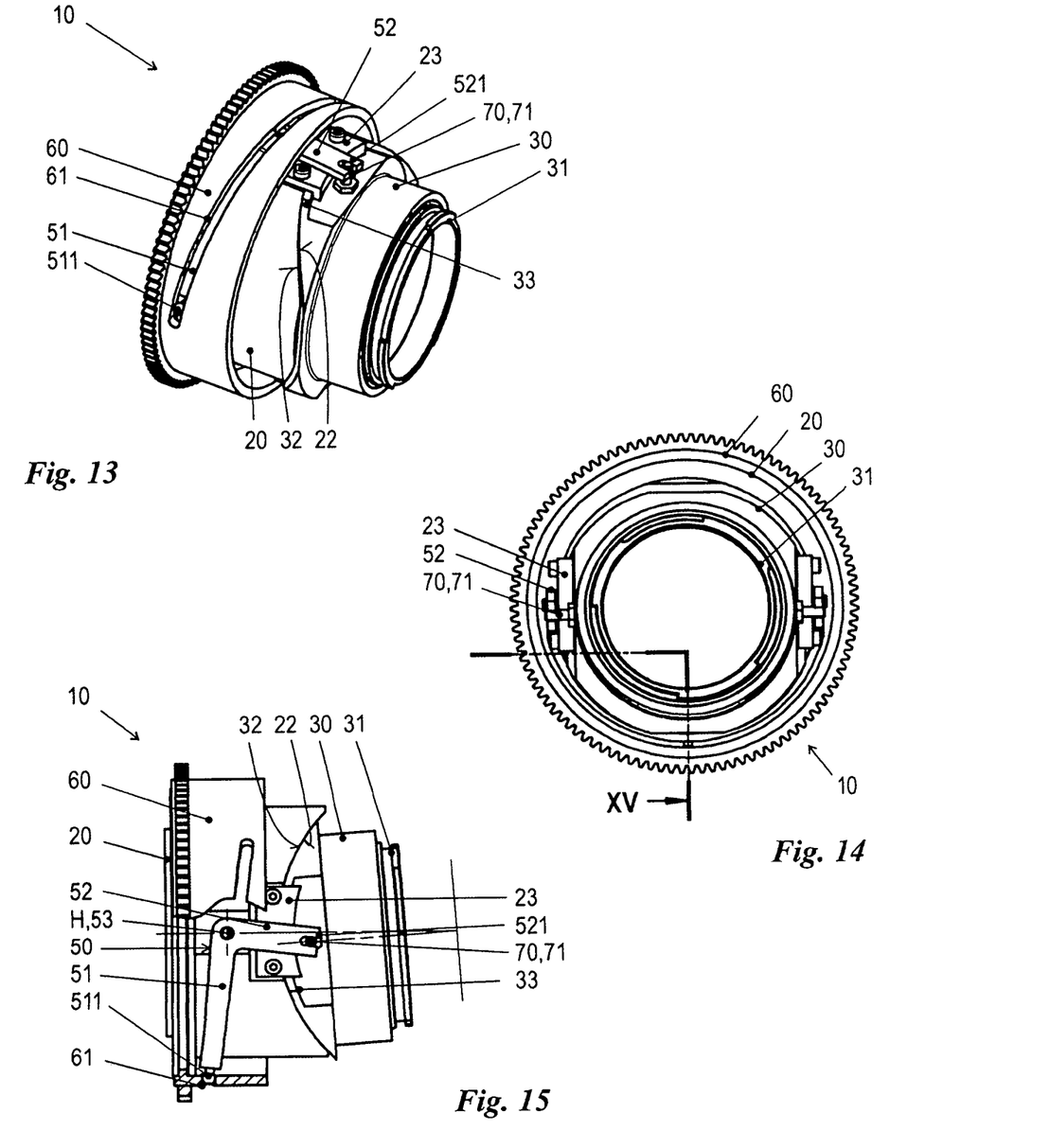
FIG. 13 shows a perspective view of the adapter of FIG. 1 without casing in a second pivoting position.
FIG. 14 shows a housing-side axial view of the adapter of FIG. 13.
FIG. 15 shows a partial cut view along section line XV in FIG. 14.

In FIGS. 13-15 the situation is exactly reversed.

Figure 16:
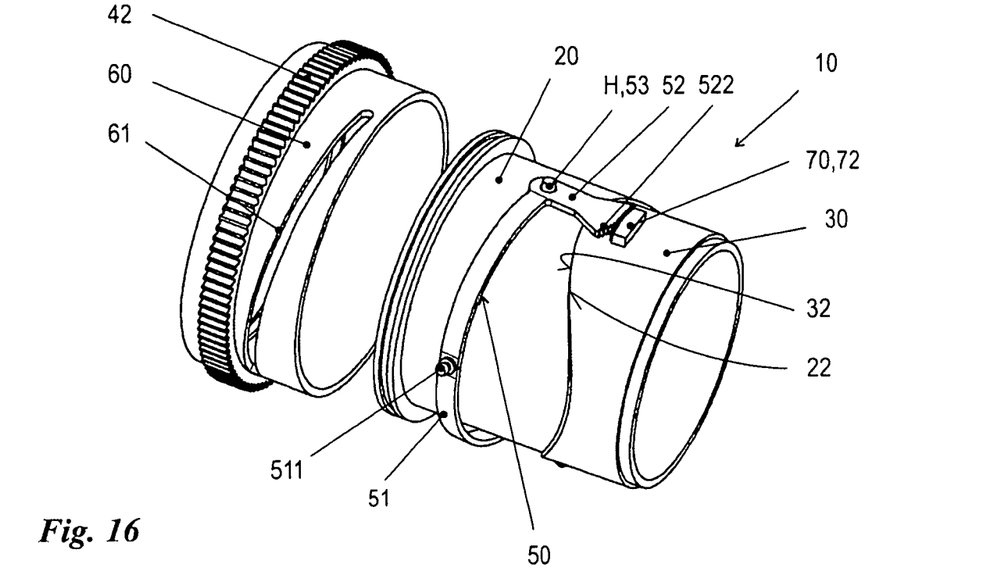
FIG. 16: a perspective view of an alternative embodiment of an adapter in accordance with the invention.
Figure 17:
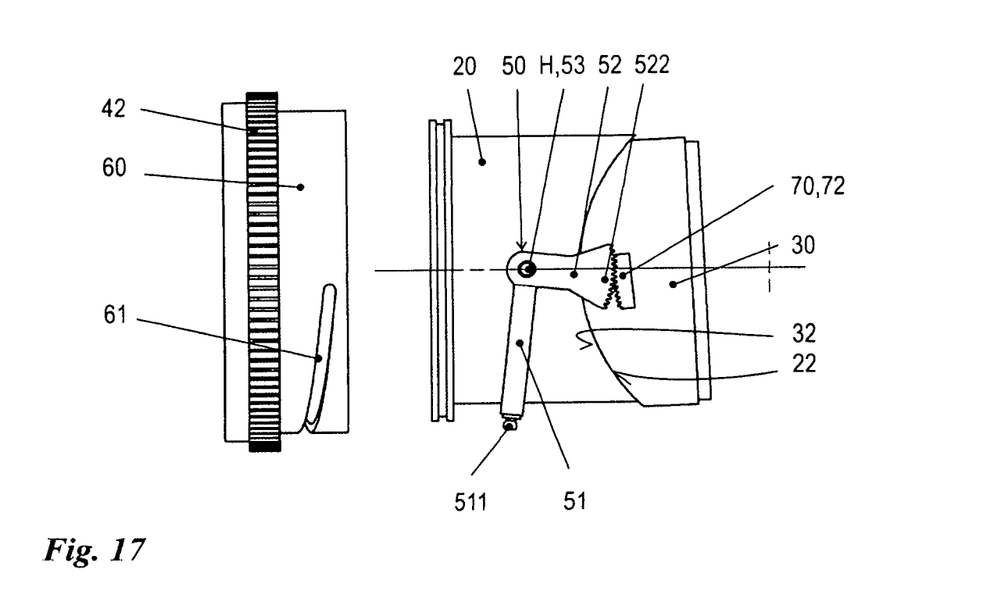
FIG. 17 shows a top view of the adapter of FIG. 16.

FIGS. 16 and 17 show an alternative coupling between the second lever arm 52 and the housing-side supporting ring 30. Here the free end of the second lever arm 52 is equipped with a partial circular arc 522 with spur toothing. This meshes with a corresponding partial circular arc 72 with spur toothing, which is fixed to the housing-side supporting ring and acts as anchor structure 70 in this embodiment. As the person skilled in the art will understand, the curvatures of the partial circular arcs 522, 72 with spur toothing must be matched to the curvature of the sliding surfaces 22, 32, taking into account the lever length of the second lever arm 52. The advantage of this type of support for the second lever arm 52 on the anchor structure 70 is the essentially linear torque transmission. On the other hand, the coupling by means of slot 521 and pin 71 as seen in the embodiment of FIGS. 2-15 has the advantage of being much easier to produce.

Furthermore, the embodiment of FIGS. 16 and 17 differs from that of the other Figures by the one-piece design of the adjusting ring 42 and the groove ring 60.

Of course, the embodiments discussed in the specific description and shown in the Figures are merely illustrative exemplary embodiments of the present invention. In the light of the present disclosure a person skilled in the art has a broad spectrum of optional variations available. In particular, the person skilled in the art will recognize that the pivoting can be carried out manually or in motorized fashion by rotating an adjusting ring, preferably an adjusting ring with external toothing, as is known from focus and aperture adjusting rings. Especially when external actuators are used, known wired and wireless remote control mechanisms can be used.

LIST OF REFERENCE NUMBERS

10 adapter
20 lens-side supporting ring
22 sliding surface on 20
23 guide plate
30 housing-side supporting ring
31 bayonet connection
32 sliding surface on 30
33 guide edge
40 casing
41 fixed part of 40
42 adjusting ring
43 tripod connection
44 locking knob
50 transmission lever
51 first lever arm of 50
511 pin
52 second lever arm of 50
521 slot
522 partial circular arc with spur toothing
53 bolt
60 groove ring
61 helical groove
70 anchor structure
71 pin
72 partial circular arc with spur toothing
Z virtual cylinder axis
H lever axis

The invention claimed is:

1. An adapter (10) for pivoting a lens relative to an image sensor in a camera housing coupled by means of the adapter (10), comprising a lens-side supporting ring (20) and a housing-side supporting ring (30), which are mounted in sliding fashion relative to one another by correspondingly cylindrically curved sliding surfaces (22, 32) facing one another, the virtual cylinder axis (Z) of the cylindrical curvature of the sliding surfaces (22, 32) lying in a plane of the image sensor, wherein
a transmission lever (50) pivotable about a lever axis (H) aligned parallel to the virtual cylinder axis (Z) is mounted on the lens-side supporting ring (20), the first lever arm (51) of which transmission lever (50) extends in a circumferential direction on the lens side of the lever axis (H) and, via a helical groove (61) and a coupling body (511) engaging into the latter, is coupled to a concentric adjusting ring (42) mounted rotatably on the lens-side supporting ring (20) and
the second lever arm (52) of which transmission lever (50) extends in an axial direction to the housing side and is supported on an anchor structure (70) fixed to the housing-side supporting ring (30).

2. The adapter (10) according to claim 1,
wherein
the adjusting ring (42) bears the helical groove (61) and the coupling body (511) is arranged on the first lever arm (51) with a 90° offset to the lever axis (H).

3. The adapter (10) according to claim 2,
wherein
the adjusting ring (42) bears the helical groove (61) indirectly via a groove ring (60) coupled to it in a rotationally fixed manner.

4. The adapter according to claim 1,
wherein
the adjusting ring bears the coupling body and the first lever arm bears the helical groove.

5. The adapter (10) according to claim 1,
wherein
the free end of the second lever arm (52) and the anchor structure (70) bear corresponding intermeshing curved toothing portions (522, 72).

6. The adapter (10) according to claim 1,
wherein
the anchor structure (70) forms a tangential force-supporting bearing with axial play for the free end of the second lever arm (52).

7. The adapter according to claim 6,
wherein
the free end of the second lever arm (52) has an axial slot (521) which embraces a pin (71) aligned parallel to the lever axis (H) and fixed to the housing-side supporting ring (30).

8. The adapter (10) according to claim 1,
wherein
the adjusting ring (42) is fixable to the lens-side supporting ring (20) in a rotationally fixed manner by means of a locking device (44).

9. The adapter (10) according to claim 1,
wherein
the adjusting ring (42) bears an external toothing as a mechanical interface to an external adjusting device equipped with a corresponding, motor-driven adjusting wheel.

* * * * *